(12) United States Patent
Velanoff

(10) Patent No.: US 12,209,499 B2
(45) Date of Patent: Jan. 28, 2025

(54) COMPRESSED AIR DRIVEN INVERTER GENERATOR

(71) Applicant: Edward D. Velanoff, Sudbury (CA)

(72) Inventor: Edward D. Velanoff, Sudbury (CA)

( * ) Notice: Subject to any disclaimer, the term of this patent is extended or adjusted under 35 U.S.C. 154(b) by 586 days.

(21) Appl. No.: 17/602,439

(22) PCT Filed: Apr. 9, 2020

(86) PCT No.: PCT/CA2020/050463
§ 371 (c)(1),
(2) Date: Oct. 8, 2021

(87) PCT Pub. No.: WO2020/206537
PCT Pub. Date: Oct. 15, 2020

(65) Prior Publication Data
US 2022/0162944 A1    May 26, 2022

Related U.S. Application Data

(60) Provisional application No. 62/831,907, filed on Apr. 10, 2019.

(51) Int. Cl.
*F01C 21/00* (2006.01)
*F01C 13/00* (2006.01)
(Continued)

(52) U.S. Cl.
CPC ............ *F01C 21/007* (2013.01); *F01C 13/00* (2013.01); *F01C 21/06* (2013.01); *H02K 7/1823* (2013.01); *F04C 2210/221* (2013.01)

(58) Field of Classification Search
CPC ...... F01C 21/007; F01C 21/06; F01C 21/008; F01C 21/001; F01C 21/08; F01C 21/10;
(Continued)

(56) References Cited

U.S. PATENT DOCUMENTS

| 4,471,250 A | 9/1984 | Snider |
| 7,898,134 B1 * | 3/2011 | Shaw .................. H02K 21/222 |
| | | 310/112 |

(Continued)

FOREIGN PATENT DOCUMENTS

| CN | 202349855 U | 7/2012 |
| CN | 204316256 U | 5/2015 |

(Continued)

OTHER PUBLICATIONS

KR20020094459A—Translation (Year: 2024).*
(Continued)

*Primary Examiner* — Christopher M Koehler
*Assistant Examiner* — Ahmed F Seck
(74) *Attorney, Agent, or Firm* — Miltons IP/p.i.

(57) ABSTRACT

A hub assembly for use in a compressed air driven inverter generator is provided. The hub assembly comprises: a hub comprising a plate with a cylindrical protrusion centered on a bottom face and a bore hole through the center of the plate and protrusion, the protrusion sized to fit into an inner bore hole of a stator and the bore hole of the hub sized to fit around without contacting an output shaft of an air motor of the generator, the plate also a trench on a bottom face and a plurality of mounting holes; a diffuser plate configured to attach to the bottom face of the hub with a plurality of air holes extending through the diffuser plate, the air holes being centered on the trench; a ring-shaped hub spacer in contact with a side of the diffuser plate opposite the hub.

13 Claims, 9 Drawing Sheets

(51) Int. Cl.
*F01C 21/06* (2006.01)
*H02K 7/18* (2006.01)

(58) Field of Classification Search
CPC .... F01C 13/00; F01C 1/00; F01C 1/02; F01C 1/22; F01C 1/24; F01C 1/36; F01C 1/344; F01C 1/3442; H02K 7/083; H02K 7/04; H02K 7/085; H02K 7/086; H02K 7/12; H02K 7/14; H02K 7/16; H02K 7/18; H02K 7/1807; H02K 7/1823; H02K 7/183; H02K 7/1838; H02K 7/1846; H02K 7/1869; H02K 7/1876; H02K 7/1884; H02K 7/1892; H02K 1/12; H02K 1/14; H02K 1/16; H02K 1/18; H02K 1/182; H02K 1/185; H02K 1/20; H02K 1/22; H02K 1/27; H02K 1/2706; H02K 1/2713; H02K 1/272; H02K 1/2726; H02K 9/02; H02K 9/04; H02K 9/06; H02K 9/08; H02K 9/12; H02K 9/14; H02K 9/28; H02K 39/00; H02K 47/04; H02K 47/14; H02K 47/20; H02K 47/26; H02K 11/05; H02K 16/00
See application file for complete search history.

(56) References Cited

U.S. PATENT DOCUMENTS

| | | | | |
|---|---|---|---|---|
| 2003/0095867 | A1* | 5/2003 | Bankstahl | F04D 29/281 416/204 R |
| 2009/0267426 | A1* | 10/2009 | Graner | H02K 9/08 310/54 |
| 2012/0304643 | A1 | 12/2012 | Mori et al. | |
| 2013/0101436 | A1* | 4/2013 | Colson | F01D 5/085 416/97 |
| 2014/0265326 | A1* | 9/2014 | Allen | F01D 1/18 320/137 |
| 2016/0072359 | A1* | 3/2016 | Kreidler | F04D 25/06 29/598 |
| 2017/0250639 | A1 | 8/2017 | Lachappelle et al. | |
| 2018/0145560 | A1 | 5/2018 | Chien | |
| 2018/0162382 | A1* | 6/2018 | Colavincenzo | B60K 6/442 |

FOREIGN PATENT DOCUMENTS

| | | | | |
|---|---|---|---|---|
| CN | 106849494 A | | 6/2017 | |
| DE | 3533750 C1 | | 3/1987 | |
| JP | 2006057568 A | | 3/2006 | |
| KR | 20020094459 A | * | 12/2002 | ............. G09B 9/042 |
| KR | 20120035281 A | * | 4/2012 | ............. F03D 9/11 |
| KR | 20170073810 A | * | 6/2017 | ............. F24F 11/00 |

OTHER PUBLICATIONS

KR20170073810A—Translation (Year: 2024).*
KR20120035281A—Translation (Year: 2024).*
International Search Report issued on International Application No. PCT/CA2020/050463 mailed Jun. 10, 2020; 3 pages.

* cited by examiner

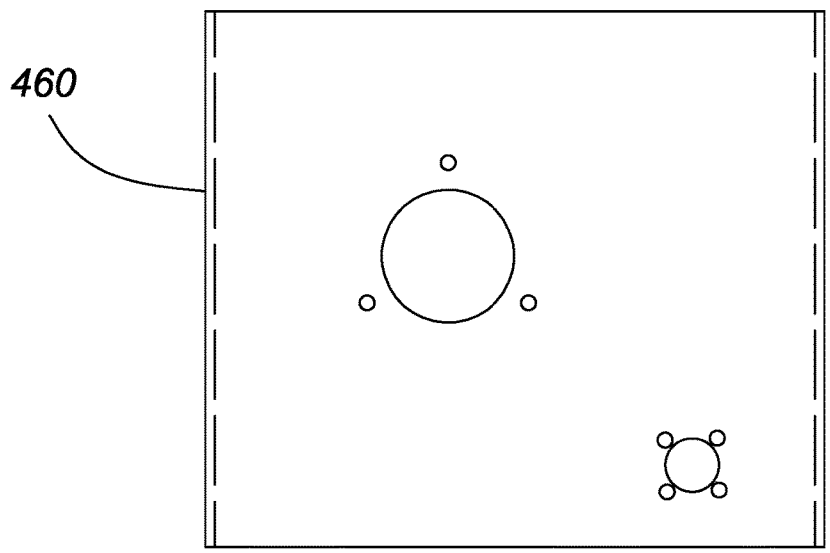
FIG. 9A
FIG. 9B
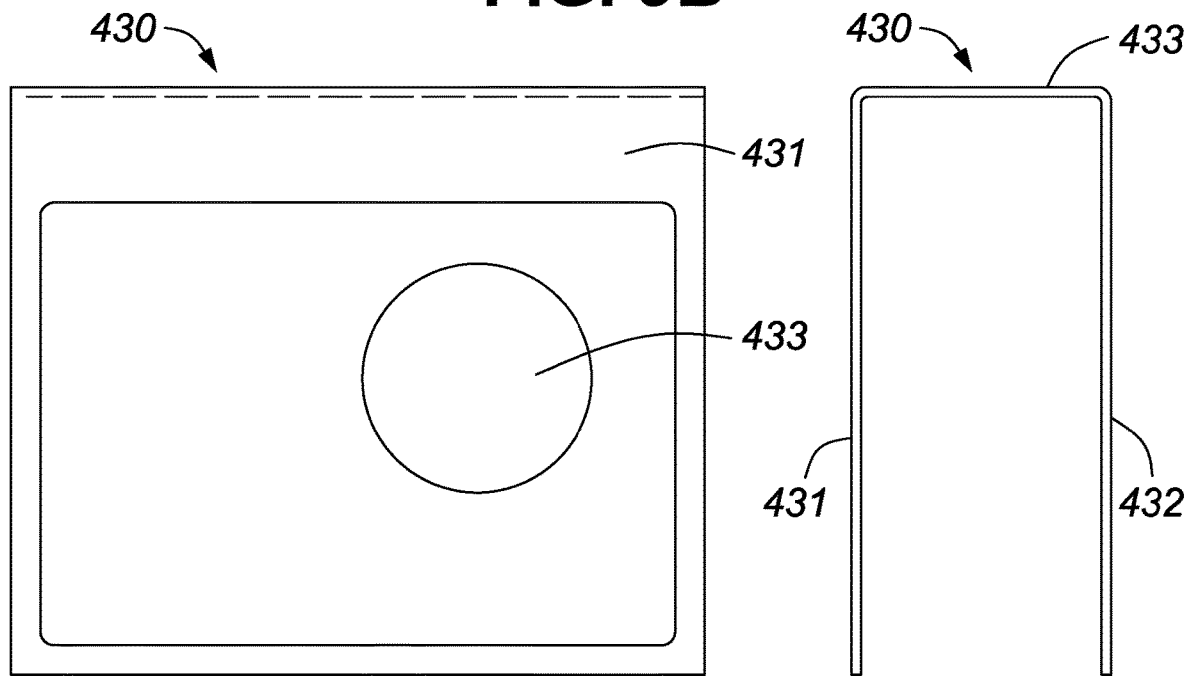
FIG. 10A  FIG. 10B

COMPRESSED AIR DRIVEN INVERTER GENERATOR

TECHNICAL FIELD

The present disclosure relates to an inverter generator driven by a compressed air motor.

BACKGROUND

Many work and home environments require backup power. This is especially true in underground mines. Examples of critical systems in underground mines that require backup power are telephone systems, mine radio systems, network systems, fire alarm systems, air flow monitoring, water levels in sumps, CO2 levels, ammonia level sensors.

Presently in underground mines, backup power is typically provided by Uninterrupted Power Supplies (UPS) or combustion engine generators. A UPS is a device used to supply electrical power to critical electrical equipment in the event of a power outage. These units consist of a battery or multiple batteries that charge while utility power is available. When utility power becomes unavailable the battery or batteries supply power to an inverter unit which will supply electrical power to the critical equipment for a sustained amount of time.

The harsh underground environment is very hard on electrical equipment due to the fact there is excessive heat, dust and poor air flow especially in electrical switch-rooms. UPS units and many other units fail after a short service life and are usually unresponsive when they are needed most during a power outage. These units also have limited run time depending on load and battery size even when they are brand new. These units can also be very costly to maintain on a regular basis and to replace. These units are widely used in underground mines for supplying electrical power to critical equipment and most often fail after a short time.

Gasoline combustion engines are prohibited in an underground environment. Although diesel combustion engines are permitted to operate in an underground environment more and more studies have shown that the exhaust emissions are harmful to humans and an unhealthy pollutant to the environment. Diesel combustion engine driven generators and other diesel equipment are being "phased out" of underground mines for this reason. Vale Canada operations recently announced they are striving to be "diesel free" by 2024, battery powered vehicles and equipment are already entering the mines across Canada and the United States and many other parts of the world to overcome this issue. With the replacement vehicles and equipment being battery powered another problem will arise. This major problem I foresee is the fact that workers will run down the vehicle's or equipment batteries to the state where the vehicle or equipment will not be able to move or get to a charging station. This will result in getting towed to a charging station which is time consuming and towing the vehicle or equipment could possibly void warranty. Even worse the vehicle or equipment could end up dying and blocking the main access ramp. This possess as a major safety concern in the event of an emergency where the vehicle is stuck behind the inoperable battery powered vehicle or equipment that is blocking the access ramp most likely having a dead battery. There is also the fact that in a power outage situation underground even though emergency vehicles or equipment may be at a charging station there will not be any mine electrical power to provide to the vehicle or equipment therefore rendering the vehicle or equipment useless or very limited in travel range.

Additionally, many workers and contractors are required to go into areas of the underground mines that are in need of reconditioning. These areas are often abandoned and have no electrical power or ventilation air flow. This becomes a major challenge when trying to send a human into these areas to perform work. For example, the area that needs work could be inaccessible with a vehicle and could also be a long walking distance from where the workers have battery chargers for their power tools and or a "make shift lunchroom" setup with possibly a microwave and small refrigerator for their lunch. Not to mention the only light underground comes from a small LED light located on every worker's hard hat. This also makes things very difficult to perform a task in these areas. Running a diesel combustion engine generator for a source of electricity in these areas is simply unacceptable and could result in death by affixation from exhaust fumes. With the introduction of more and more battery powered vehicles, equipment and tools more issues are going to arise in underground mining environment and confined spaces that are in remote locations of the mine(s).

Running diesel combustion engine driven equipment underground not only produces harmful emissions to humans and the environment, they also consume valuable air in the combustion process and create excessive unwanted heat which is also a growing concern to the underground mining industry. As the mine gets deeper, the air is naturally hotter by nature. In many cases, air temperatures can be as high as 36-41 degrees Celsius in the lower parts of the mine. These high temperatures are making working conditions difficult for a human. Almost all major companies are moving toward removing diesel combustion engine driven equipment to reduce high temperature, air polluted working environments.

Diesel generators are not usually the inverter type meaning they run "full throttle" to maintain 60 Hz regardless of load. Diesel driven generators need a constant supply of fuel and maintenance.

Mine power system (not available in many locations or only 600-volt power is available) can require costly step-down equipment to get 120 volt power. The equipment is very heavy and costly since the equipment needs to be ground fault protected as specified by "M421".

CN Patent No. 10316655 refers to a "pneumatic inverter generator" specifically designed for use in an explosive environment such as a coal mine. In this patent, the stator and rotor are mounted separately from the motor and the two separate shafts being coupled through a coupling. This has many downfalls such as misalignment, limited to low RPM, the need for at least one bushing or bearing and housing arrangement to support the rotor assembly opposite side of the coupling. The air motor used is a conventional vane type air motor, low speed, low efficiency, very loud and usually require oil. Air motors that use oil tend to exhaust an oil mist into the atmosphere. The patent does not discuss or show any type of safety mechanisms or failsafe devices. The patent states that it is specifically designed for explosive environments and therefore, the entire assembly is in an explosion proof enclosure. However, there is not cooling system shown or discussed in the patent.

SUMMARY

In one aspect, there is provided a hub assembly for use in a compressed air driven inverter generator, the hub assembly comprising: a hub comprising a plate with a cylindrical protrusion centered on a bottom face and a bore hole through the center of the plate and protrusion, the protrusion sized to fit into an inner bore hole of a stator and the bore hole of the hub sized to fit around without contacting an output shaft of an air motor of the generator, the plate also having a trench on a bottom face, the trench forming a closed loop, a plurality of cooling ports through the hub evenly spaced in the trench and a plurality of mounting holes though the plate, and socket on a top face opposite the bottom face, the socket being concentric with bore hole and sized to fit around the exterior of the air motor; and a plurality of mounting holes; a diffuser plate configured to attach to the bottom face of the hub with a plurality of air holes extending through the diffuser plate, the air holes centered on the trench; a hub spacer in contact with a side of the diffuser plate opposite the hub.

The generator disclosed herein solves the problem of supplying back up power for critical systems in an underground mine or in any environment requiring backup power. It can serve as emergency power source for a refuge station in an underground mine. It can provide a 100% pollution free Alternative to diesel engine driven generators in an underground environment. It can provide a clean energy source for underground mining, and confined space applications. It can provide a portable emergency charging source for new battery powered vehicles and equipment that are entering underground mines. Additionally, it can provide a reliable, low maintenance power source for monitoring equipment in remote areas of an underground mine. Example: supplying power to a camera to monitor a sand-fill area that is dangerous to human health, and or monitoring "heated areas" for dangerous levels of toxic gasses.

BRIEF DESCRIPTION OF THE DRAWINGS

FIG. 9A is a top view line drawing of a top plate portion of a housing for a compressed air driven inverter generator in accordance with one example embodiment of the present disclosure;

FIG. 9B is a side view line drawing of a top plate portion of a housing for a compressed air driven inverter generator in accordance with one example embodiment of the present disclosure;

FIG. 10A is a top view line drawing of a base plate of a housing for a compressed air driven inverter generator in accordance with one example embodiment of the present disclosure; and FIG. 10b is a top view line drawing of a base plate of a housing for a compressed air driven inverter generator in accordance with one example embodiment of the present disclosure.

DETAILED DESCRIPTION

Figure 1:
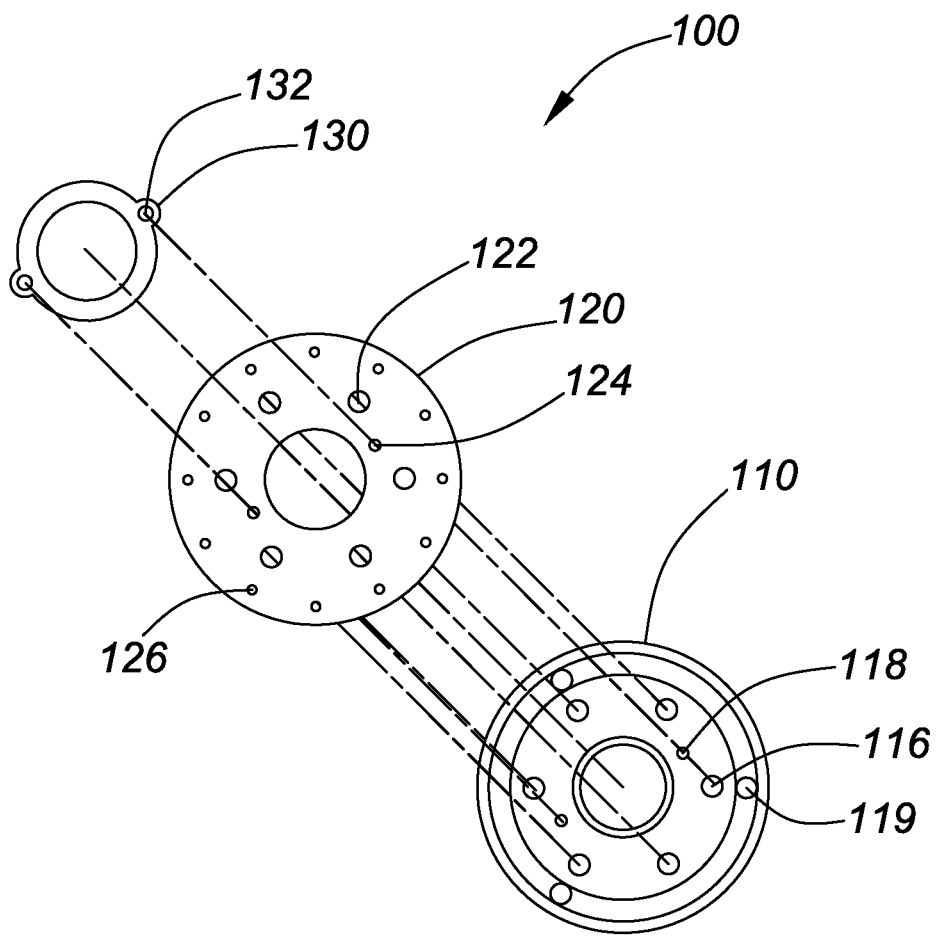
FIG. 1 is an exploded line drawing of a hub assembly in accordance with one example embodiment of the present disclosure.

The present disclosure relates to a compressed air driven inverter generator and the components thereof. An embodiment of the generator comprises an air motor, an inverter unit, a hub assembly connecting the air motor to a generator unit or permanent magnet alternator, and a housing.

Underground mines have massive networks of piping systems used to distribute compressed air throughout the whole mine. These networks of piping systems are very large and, in some cases, can total hundreds of kilometers in length. This results in compressed air storage on a massive level. The network of compressed air lines is always charged up to system pressure and maintained by large electric compressors located on surface. These lines have been in place long before electricity was routed to many locations in the mine(s). Before the introduction of electric powered equipment in underground mines, all the equipment was driven by compressed air or diesel. It served two purposes. 1: it served as an energy source for powering mining equipment and second the exhaust air from the equipment provided cool dry breathable air for the worker operating the equipment underground or in a confined space. Since electrically driven equipment is generally more efficient then air driven equipment, electric equipment has replaced most air driven equipment as prime movers. The electric driven equipment still uses the compressed air for other purposes. The compressed air infrastructure remains in use and is still one of the first of two services to be installed in new locations underground. The second is water and electricity usually comes last and only where need be due to the fact that it is much more costly to install. Almost all areas, new and old, in underground mines have compressed air and water available but less than 50% of these same areas have electricity. For the most part the compressors on surface very rarely shut down but in the event of a total power outage where even the compressors are off, the sheer scale of the compressed air infrastructure piping system stores enough compressed air energy to operate a Compressed Air Inverter Generator (as disclosed herein) for days or even weeks depending on how many units would be running. The disclosed Compressed Air Driven Inverter Generator would be an excellent choice for emergency situations.

The Compressed Air Driven Inverter Generator disclosed herein is primarily targeted at an underground mining environment or operating in confined spaces. However, it can be used in any situation requiring backup power or where no other source of power is available. The environmentally friendly prototype unit currently exhaust's 100% clean breathable air as a by-product while producing up 1800 watts continuously and 2200 watts momentarily of 120-volt clean AC electrical power. Air motors can also be completely stalled while under full air pressure for long periods of time without harm to the motor. Another advantage is that air motors do not produce any heat while operating. These advantages make the disclosed generator a safety-oriented apparatus.

A prototype generator according to the present disclosure used either GAST MVP05 or a GAST MVP06 motor made by GAST. Other motors can be used, such as the Ingersoll Rand 4800 series air motors, in particular the 4800D. These motors are high RPM, do not require oil, low maintenance, and extremely lightweight for the horsepower they produce.

Preferably, the generator comprises an air motor that does not require oil. The prototype unit is approximately 19.5" tall×12" wide×13" deep and weighs approximately 51 lbs and can be easily carried by most workers. Other embodiments are possible. For example, output ranges from 1800 watts continuous to 2800 watts continuous are feasible.

The generators disclosed herein can be paralleled together to double the power output which has major advantages over a single larger unit. For example: a worker can carry one unit at a time to a location and then return to retrieve a second unit without the help of another worker. One unit at a time is easier to move twice than a larger heavier single unit. Another advantage of paralleled units is that it provides some redundancy: if two units are be operating to supply emergency power for critical equipment or in an emergency situation and one unit were to fail, you would still have one unit operating. Larger output units that are physically no larger than the smaller unit but slightly heavier (5 lbs) are also possible. The different units can be tailored for different applications underground. For example: a portable unit may be made of lightweight aluminum material with an easy to carry physical shape, have ergonomic friendly carry handles and only the necessary options to save weight, while another unit may be purchased primarily for emergency back-up power near a refuge station supplying power for a microwave, refrigerator, telephone, computer and mine radio system power supply unit or located in a switch-room operating remotely over the mine VHF radio system while supplying power for PLC units that monitor all kinds of critical levels.

Efficient inverter technology allows for variable speed operation to accommodate load, which reduces air consumption and noise levels at low power output level and reduces wear on the motor. For example, the unit can be programmed to only run at a proportional speed dictated by power demand.

The disclosed generators comprise a hub assembly that connects the output shaft of an air motor to a rotor of the generator and provides cooling for the generator and components. The design of the hub assembly serves six major functions. First, it serves the purpose of combining the air motor, stator, rotor into one small light-weight assembly. Second, it serves as a cooling system method" by way of the compressed cooling air passing through the cooling ports and a 360-degree channel in the hub and airholes in the diffuser plate and also introduces air flow into the chamber. Third, it serves as a single mounting point for the whole assembly (air motor, stator, cooling system, and rotor) to a housing of the generator. Fourth, the hub assembly allows perfect centering alignment of the stator and rotor with respect to the air motor shaft. Fifth, the hub assembly absorbs heat from the stator through surface contact. Sixth, the hub assembly serves as a place to secure a wiring harness exiting the stator to prevent the wiring from having contact to rotating parts.

In a preferred embodiment, the hub assembly is made of 6061 Aluminum Alloy. Other metals or suitable materials are possible, such as steel, ceramic or suitable plastics.

Figure 2A:
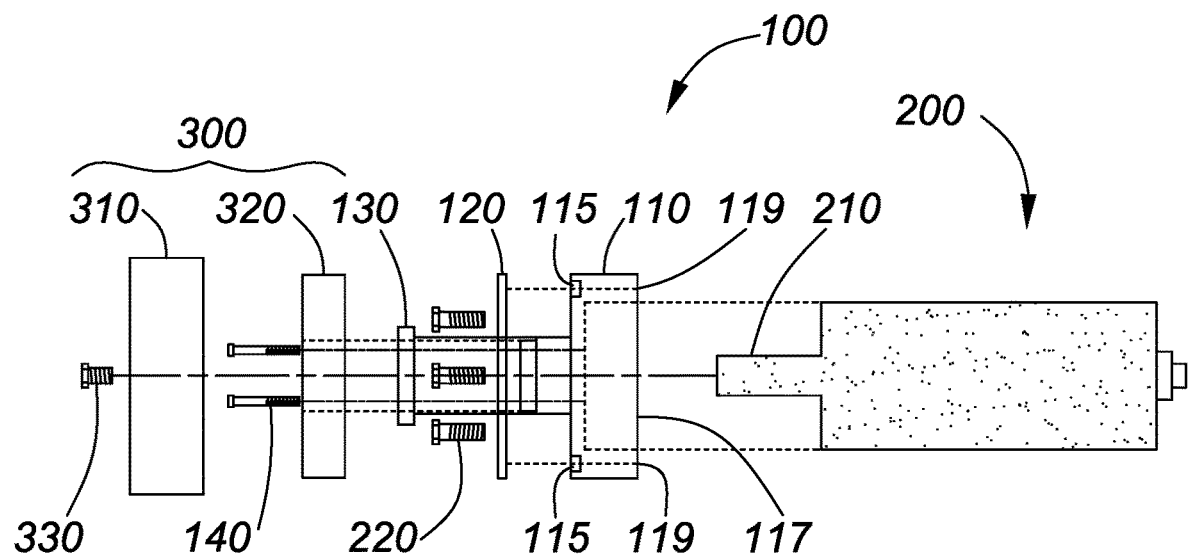
FIGS. 2A is an exploded side view line drawing of the components of a hub assembly in accordance with one example embodiment of the present disclosure.
Figure 2B:
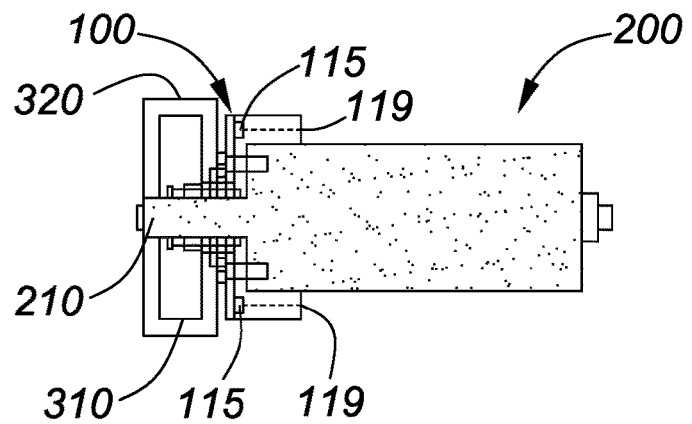
FIGS. 2B is an assembled side view line drawing of the components of a hub assembly in accordance with one example embodiment of the present disclosure.

Referring to FIGS. 1 and 2, one embodiment of the hub assembly 100 comprises a hub 110, a hub spacer 130, and a diffuser plate 120, which are combined as one piece with bolts 330, 140 and 220. In use, air motor mounting bolts 220 attach the diffuser plate 120 to the hub 110 through mounting holes 122 in the diffuser plate and mounting holes 116 in the hub. Bolts 140 are sized to go through mounting holes 132 in the hub spacer 130, mounting holes 124 in the diffuser plate and mounting holes 118 in the hub. Other methods of attaching the components are possible and in some embodiments the hub and hub spacer are machined as one piece.

Figure 3A:
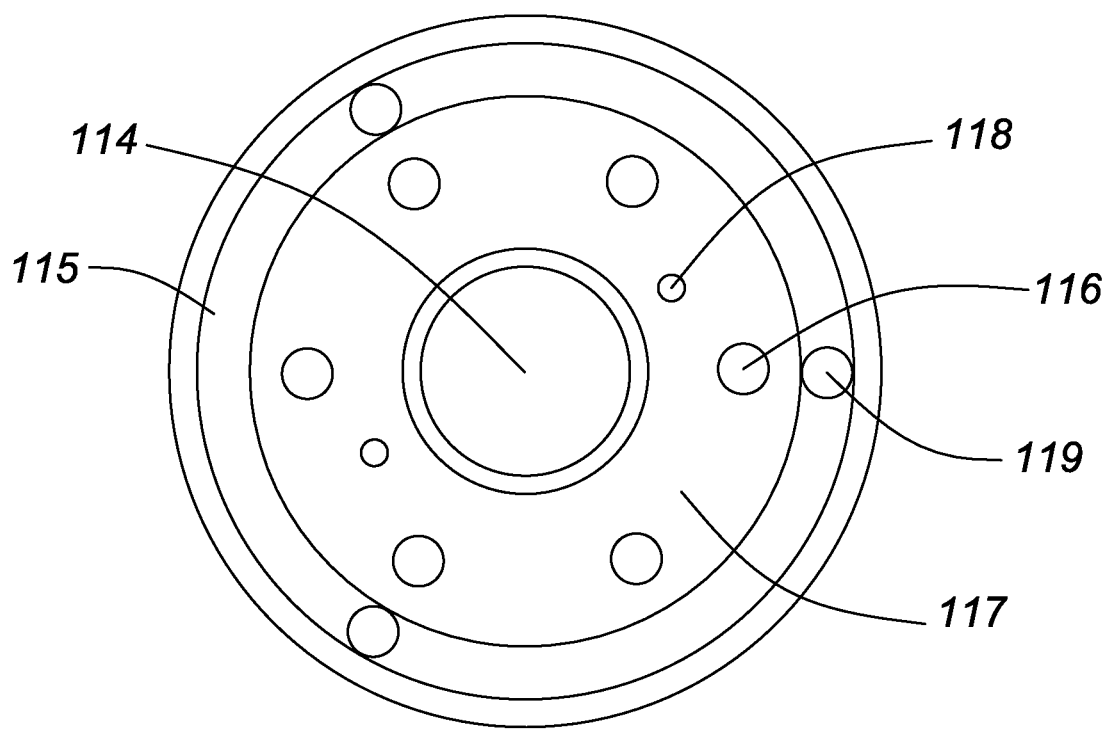
FIG. 3A is a top view line drawing of a hub mount in accordance with one example embodiment of the present disclosure.
Figure 3B:
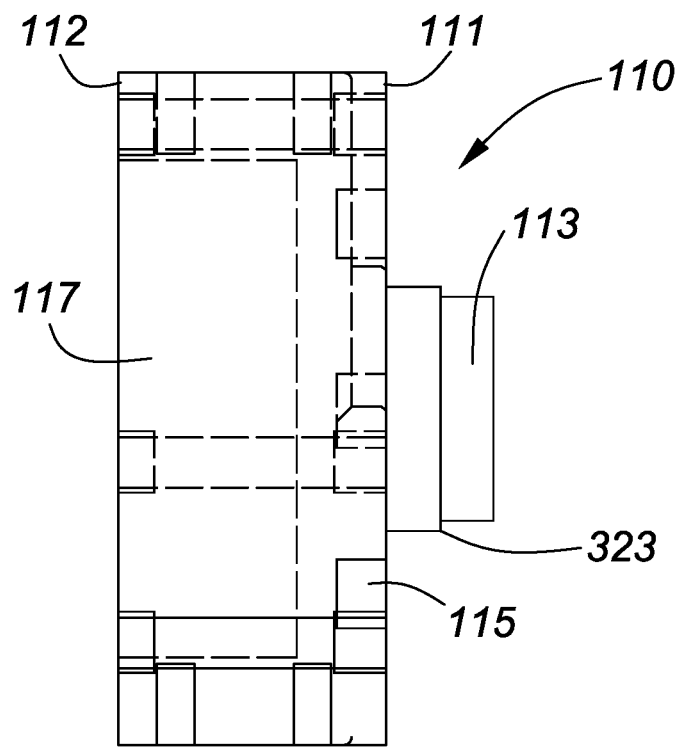
FIG. 3B is a side view line drawing of a hub mount in accordance with one example embodiment of the present disclosure.
Figure 4:
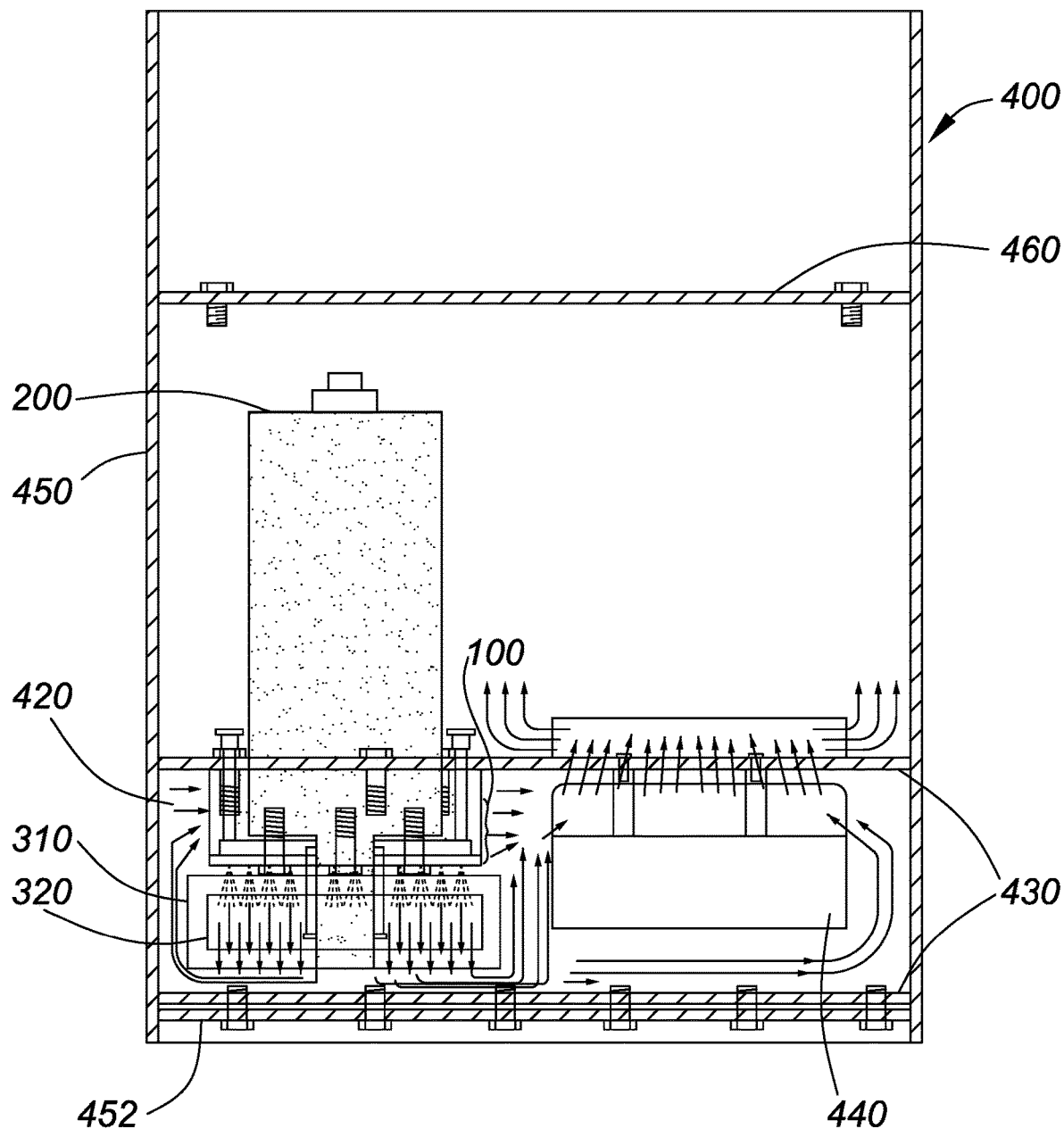
FIG. 4 is a line drawing of a cross-section front view of a compressed air driven inverter generator in accordance with one example embodiment of the present disclosure.
Figure 5:
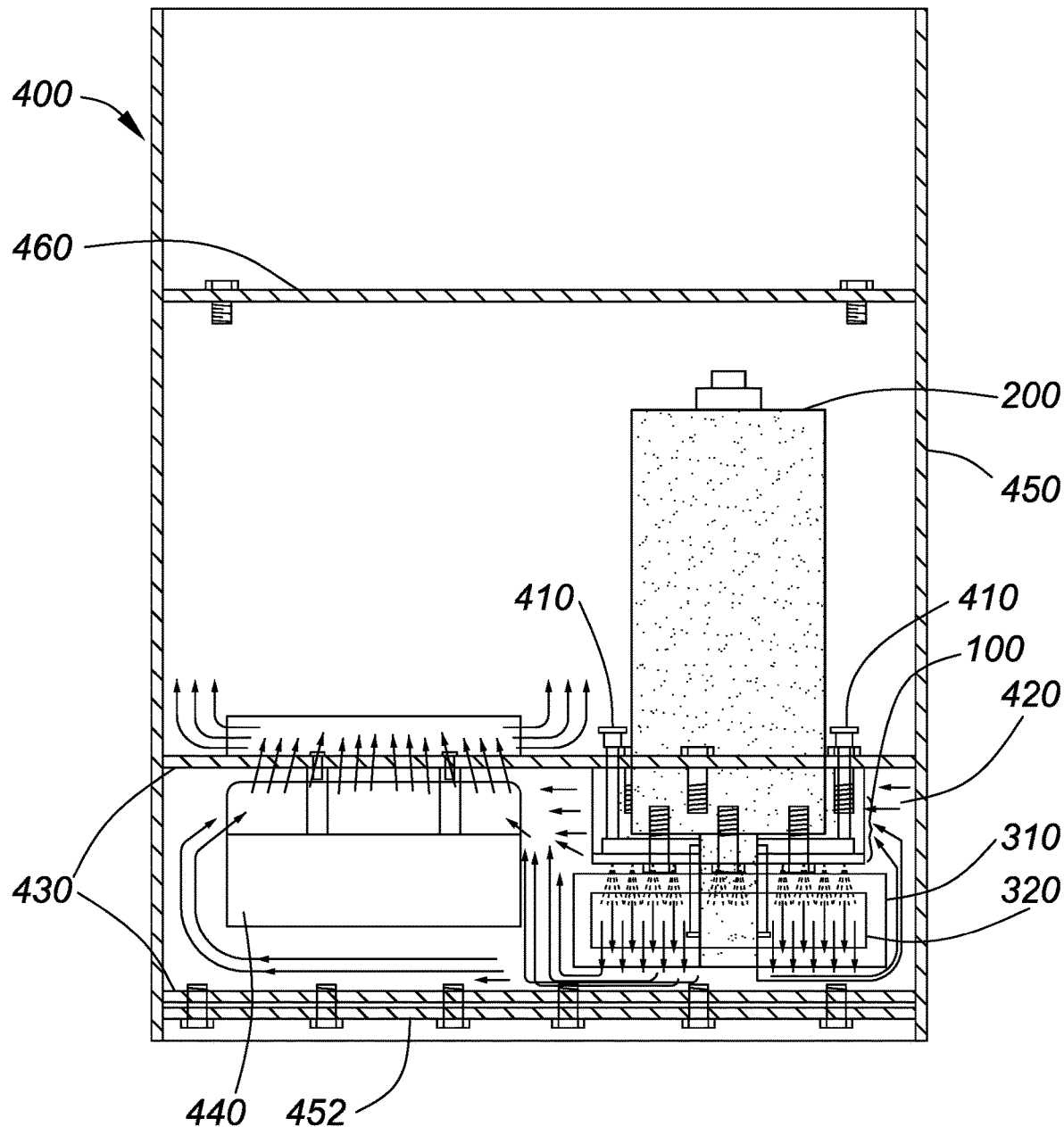
FIG. 5 is a line drawing of a cross-section back view of a compressed air driven inverter generator in accordance with one example embodiment of the present disclosure.

Referring to FIGS. 3A and 3B, the hub 100 comprises a plate with a cylindrical protrusion 113 centered on a bottom face 111 and a bore hole 114 through the center of the plate and protrusion. In a preferred embodiment, the plate is circular. However, other shapes are possible, such as circular with flattened milled portions for mounting, oval, or even square or rectangular. The protrusion 113 is sized to fit into an inner bore hole of a stator 320 of a stator/rotor assembly 300. The bore hole of the hub 110 is sized to fit around without contacting an output shaft 210 of an air motor 200 of the generator. The plate also has a closed loop trench 115 on the bottom face 111, a plurality of cooling ports 119 through the hub evenly spaced in the trench 115 and a plurality of mounting holes 116 and 118 though the plate, and a socket 117 on a top face 112 opposite the bottom face 111, the socket 117 being concentric with bore hole 114 and sized to fit around the exterior of the air motor 200. In a preferred embodiment, the trench is circular.

The diffuser plate 120 is configured to attach to the bottom face 111 of the hub 110 with a plurality of air holes 126 extending through the diffuser plate 120, the air holes 126 being in a circular pattern and centered on the trench 115. In a preferred embodiment, the diffuser plate is circular. Other shapes are possible.

The hub spacer 130 contacts with a side of the diffuser plate 120 opposite the hub 110. In a preferred embodiment, the hub spacer is ring-shaped. Other shapes are possible.

The hub 110 for the prototype model was machined from 6061 aluminum to save weight and to absorb heat from the stator 320. The hub is a one piece unit and connects the stator 320, rotor, air motor, cooling system into one assembly. The output shaft 210 of the air motor 200 sits inside a bore hole 114 of the hub 110. In use, the output shaft 210 of the air motor 200 extends through the hub assembly 100 to the rotor/stator assembly 300 where it is bolted in place with a rotor mounting bolt 330.

In some embodiments, the stator's inner bore hole sits on a machined shoulder 323 of the protrusion 113 to ensure that it is on center with respect to the output shaft 210 of the air motor 200. In one embodiment, the stator 320 is bolted in place using 2 M5 bolts 140 that pass through the hub spacer 130 and diffuser plate 120 and thread into the hub 110. More bolts or other methods of attachment are possible. The output shaft 210 of the air motor 200 comes through the borehole 114 of the hub 110, diffuser plate 120, hub spacer 130 and the center of the stator 320. For one prototype, the output shaft of the air motor was modified with a 6-degree taper. The rotor 310 fits on to the output shaft 210 of the air motor 200 and is secured to the output shaft of the air motor with a bolt 330 (eg ¼") into the center of the shaft 210. The result is a centered rotor 310 that is fastened securely to the air motor's output shaft 210 and is centered over top of the mating stator 320. In some embodiments, the hub 110 also has three mounting holes on the back side to secure this the hub assembly to a base plate of the generator housing.

In some embodiments, three cooling ports 119 are incorporated into the hub 110. In some embodiments the cooling ports extend through the circular plate of the hub in the trench 115. The cooling ports 115 in conjunction with the diffuser plate 120 aide in cooling the stator and rotor assembly 300 and other generator components.

The hub spacer 130 connects the hub 110 to the stator 320. The hub spacer 130 serves four different functions. Function#1: The hub spacer is a mirror image of the stator's mounting face and acts as an interface between the hub and the stator for mounting purposes. Function#2: the hub spacer creates a gap between the stator windings and the diffuser plate 120 which creates room for the cooling air to expand and cover a wider surface area of the stator windings. Function#3: The gap created between the diffuser plate and the hub face also creates space for the wiring harness to extend out from the stator 320 windings. In a preferred embodiment, the hub spacer 130 is waterjet cut from 6061 0.375" Aluminum plate or 375" thick, 500 series Aluminum.

The diffuser plate 120 is for the purpose of redirecting pressurized air. When combined with the hub 110 it creates a 360-degree enclosed channel all the way around the bottom face 111 of the hub 110. In a preferred embodiment, the diffuser plate 120 is machined from 6061 Aluminum. Other materials or means of manufacturing are possible. The diffuser plate 111 of one prototype has 12×0.100" holes drilled through and centered over top of the trench 115 of the hub 110. More or less holes are possible and other diameters of holes and combinations are possible. The cooling ports 119 allow pressurized air to enter the trench 115, and then the air exits through the diffuser air holes 126 in a circular pattern. This circular pattern is located directly below the stator 320 windings and is used to remove heat from the stator windings and the rotor 310.

In some embodiments of the disclosed generator uses a cooling system that utilizes a branch-off air circuit taken from the air motor's 200 inlet. The compressed air flows through a flow regulator to achieve a sufficient amount of flow for cooling purposes. In some embodiments, the branch off circuit is ¼". The flow regulated air pressure will split into three separate lines (can be ¼") and connect to three fittings attached to the top face 112 of the hub 110 at cooling ports 119 spaced at 120 degrees apart (around the air motor). More or less lines are possible. The pressurized air travels through three separate cooling ports 119 extending through the length circular plate of the hub 110. As the cool, pressurized air travels through the cooling ports 119, the air removes heat from the hub 110 that has been absorbed from the stator 320. At the bottom face 111 of the hub 110, there is a trench 115 in the form of a deep groove or channel in the face of the hub. In some embodiments the trench 115 is ¼". The trench is in a circular pattern (360 degrees) cooling ports 119 exit into the trench 115, thus creating a channel for the cooling air to be redirected by ninety degrees in two directions (or 180 degrees). The diffuser plate 120 is a plate that is a mirror image of the bottom face 111 of the hub 110. In a preferred embodiment, the diffuser plate 120 has 12×0.100" evenly spaced (30 degrees apart) diffusing air holes 126 drilled into it on the same radius as the 360-degree trench 115 in the hub 110. The diffuser plate 120 when fastened to the hub 110 creates an enclosed channel 360 degrees around the entire hub 110. The enclosed channel becomes pressurized by the cooling air and exits through the diffuser air holes 126 in an evenly spaced 360-degree pattern located directly below the stator 320 windings. The result is an evenly spaced spray pattern for the pressurized cooling air. The pressurized cooling air passes through the stator 320 in an even manner effectively cooling the stator windings.

The hub assembly 100 eliminates the need for separate a bearing housing, bearings, shaft couplings, separate mounting plate, and misalignment issues with the stator and rotor 300 with respect to the air motor output shaft 210.

In one embodiment, the generator can be mounted to a wall or other such structure using a wall mount bracket. The wall mount bracket in some embodiments is a water jet cut mounting plate made from 500 series Aluminum. In some embodiments the wall mount bracket is made of 0.375" thick, 500 series Aluminum alloy.

Referring to FIGS. 4 to 10, in some embodiments, the generator 400 comprises a housing made up of a PMA (Permanent Magnet Alternator) cover 452, a base plate 430, a top plate 460, a face plate 470 and a jacket 450. The housing is designed to create an enclosed air chamber 420 in combination with the hub assembly 100 to provide cooling for the generator 400 and its components an to create a positive pressure atmosphere to keep dirt out of the chamber and away from the generator's moving parts.

Figure 8A:
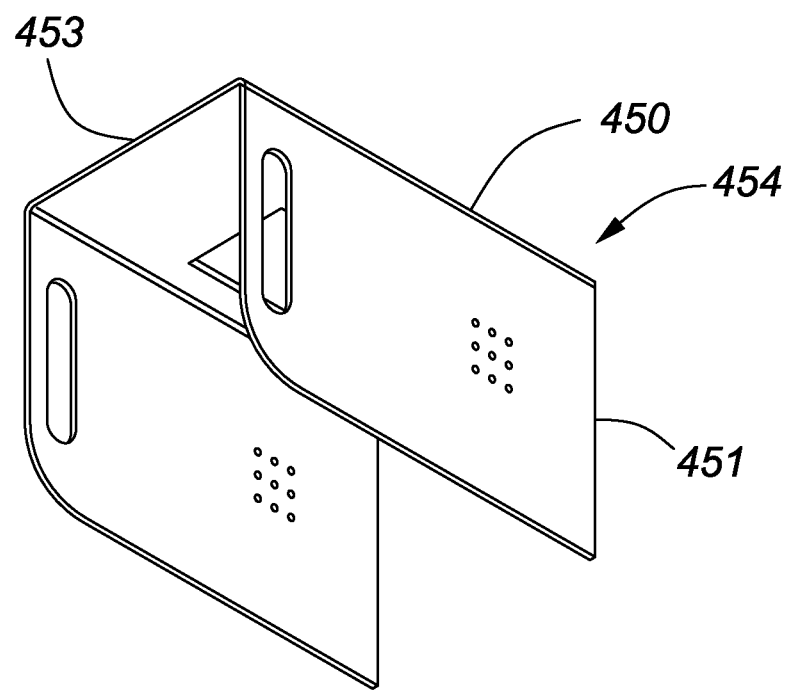
FIG. 8A is a perspective view line drawing of a jacket portion of a housing for a compressed air driven inverter generator in accordance with one example embodiment of the present disclosure.
Figure 8B:
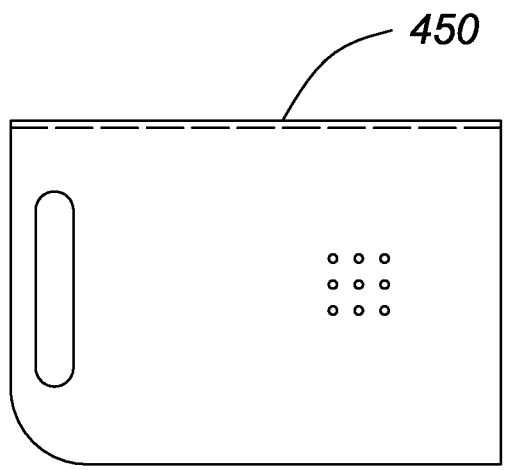
FIG. 8B is a side view line drawing of a jacket portion of a housing for a compressed air driven inverter generator in accordance with one example embodiment of the present disclosure.
Figure 8C:
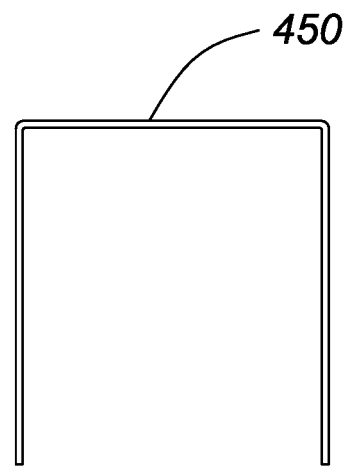
FIG. 8c is a top view line drawing of a jacket portion of a housing for a compressed air driven inverter generator in accordance with one example embodiment of the present disclosure.

The jacket 450 is u-shaped with three vertical walls and is shown in detail in FIGS. 8A to 8C. The PMA cover 452 attaches across a base plate 430. The base plate 430 is u-shaped and with the open end of the U attaching to a back wall 453 of the jacket 450. A bottom surface 431 of the base plate 430 attaches to the PMA cover 452 and a top surface 432 attaches to the back wall 453 of the jacket 450. The top and bottom surfaces 431 and 432 of the base plate 430 cover the width of the jacket 450. The air motor 200 extends through an opening 433 in the top surface 431 of the base plate 430 with the output shaft end attached to the hub assembly 100 being between the top surface 431 and the bottom surface 432. The top plate 460 extends across a top end of the jacket 450 above the air motor 200. An embodiment of the top plate 460 is shown in FIG. 9A and 9B. The face plate 470 extends from the top plate 460 to the base plate 430 across the open end of the U of the jacket 450 closing off the space in which the top portion of the air motor 200 is located.

An embodiment of the base plate 430 is shown in more detail in FIGS. 10A and 10B. The base plate 430 serves many purposes. The base plate 430 when combined with the jacket 450 and the PMA Cover 452 forms an enclosure for the stator 320, rotor 310, primary inverter unit 440, voltage regulator (not shown), and wiring harness (not shown). The enclosure protects the equipment inside from the outside environment, and keeps the rotating equipment concealed within. In some embodiments, the enclosure has been designed so that positive air pressure is induced from the hub assembly located inside the enclosure and flows out through a vent located above the primary inverter unit. The result is a steady flow of cool air entering, removing heat, and exiting the enclosure while also keeping any dirt or debris out of the enclosure. The top surface 431 of the base plate 430 also provides a place to mount the primary inverter unit, voltage regulator, and hub assembly and in the preferred embodiment, with 3 bolts. The base plate also provides structural strength to the jacket 450. In one embodiment, the base plate is made of 500 series aluminum. Aluminum also provides excellent heat dissipation. In the preferred embodiment, the base plate is made of 0.187" thick, 500 series aluminum alloy. Other materials and sizes are possible.

The top plate 460, when assembled with the jacket, face plate and the base plate, forms an enclosed area to house the air motor, air control circuits, Main Control Board, and many other items involved in the operation of the generator. The top plate also serves as mounting for a main air shut-off valve and the face plate and provides structural strength to the jacket and face plate. A preferred embodiment of the top plate is made of 0.187" thick, 500 series Aluminum alloy. Other materials and sizes are possible.

Figure 6:
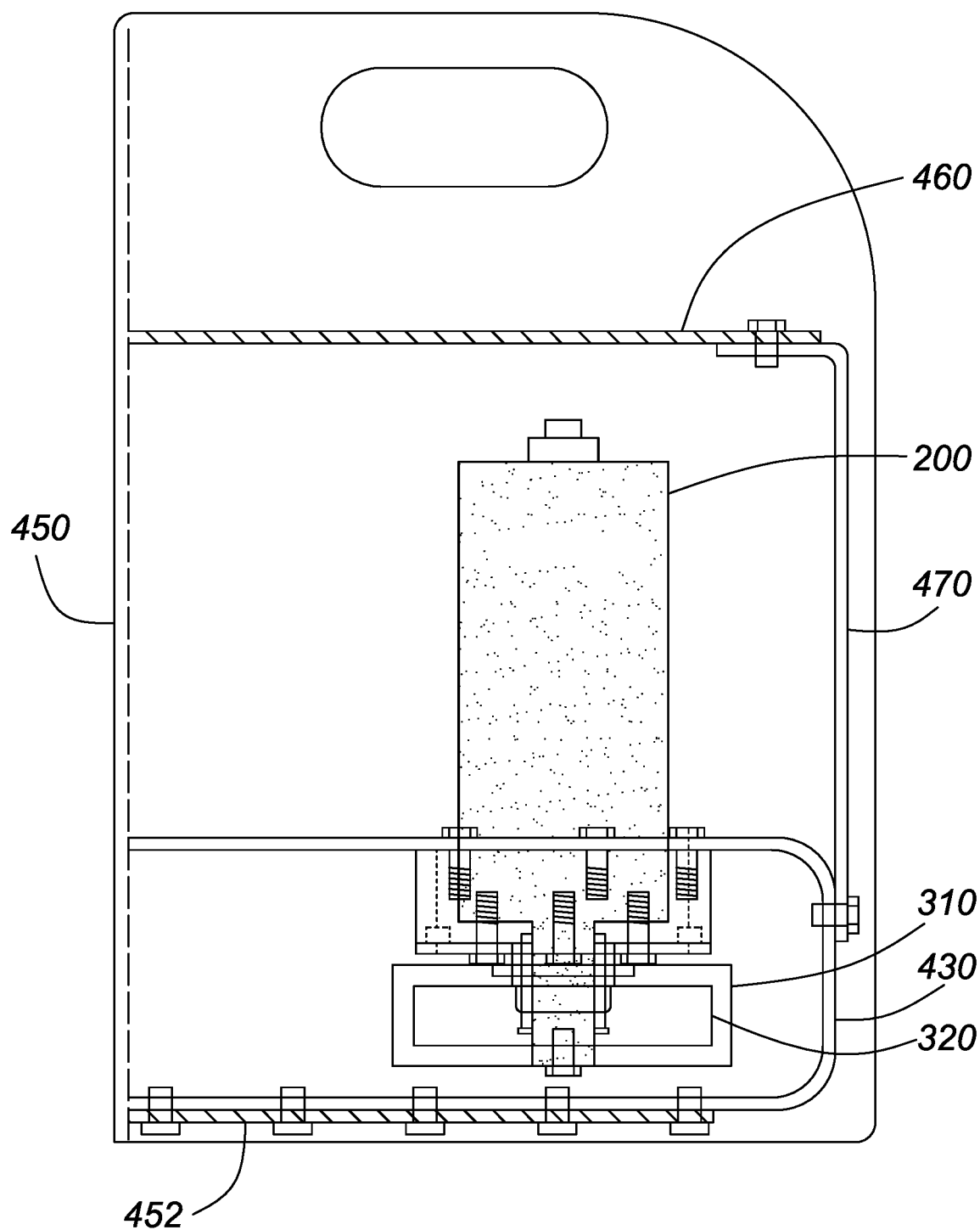
FIG. 6 is a line drawing of a cross-section left side view of a compressed air driven inverter generator in accordance with one example embodiment of the present disclosure.
Figure 7:
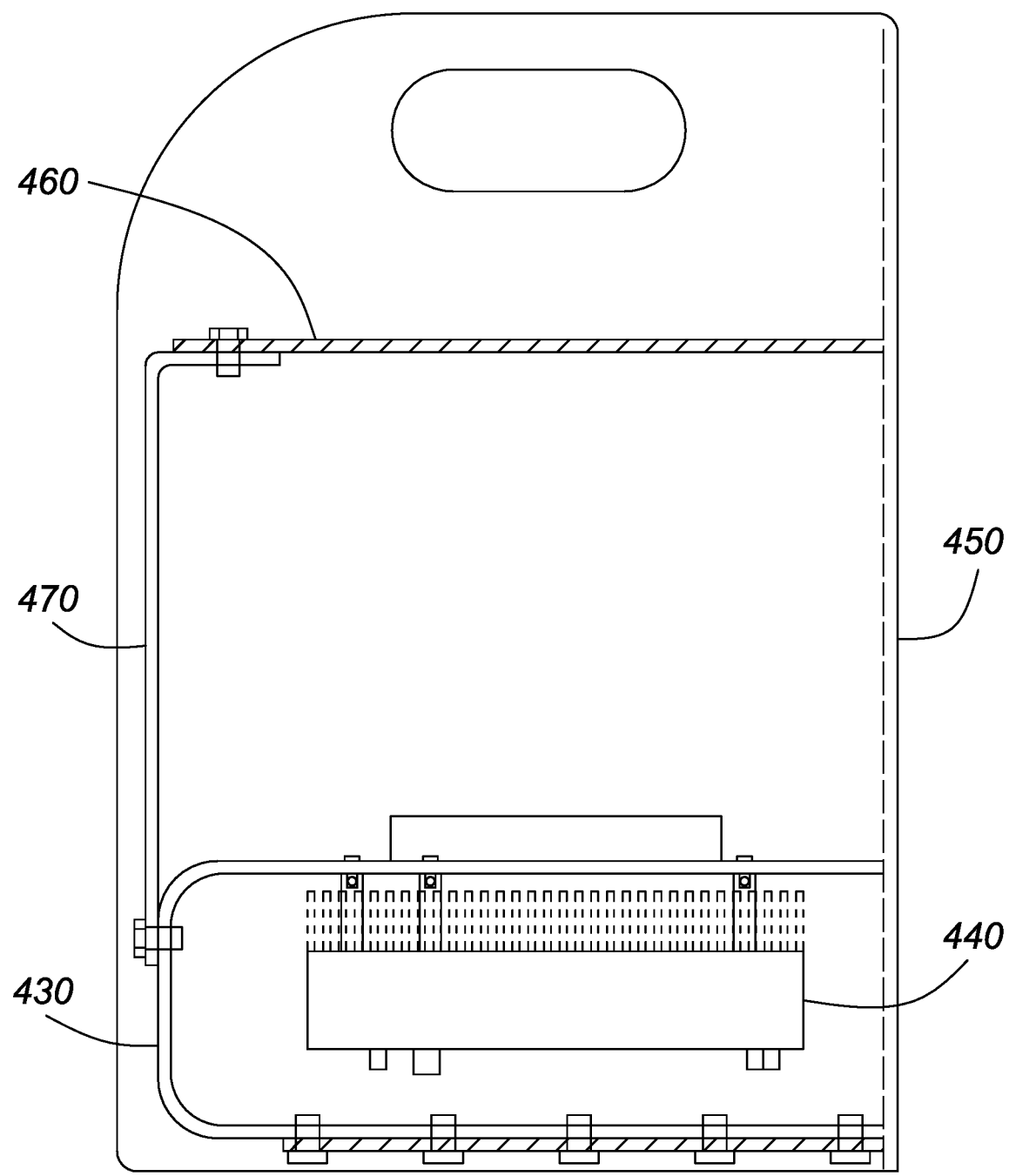
FIG. 7 is a line drawing of a cross-section right side view of a compressed air driven inverter generator in accordance with one example embodiment of the present disclosure.

The face plate 470, shown in FIGS. 6 and 7, is primarily designed to provide a place to mount outside controls and user interface. The face plate also provides structural strength to the top plate, base plate, and the jacket. A preferred embodiment of the face plate is made from 0.187" thick 500 series Aluminum alloy. Non-limiting examples of the outside controls include: 20-amp GFCI receptacle; 20-amp Circuit breaker; Red indicator; Green indicator; 4×20 LCD display; Key switch; Bonding terminal (for earth grounding); Emergency stop button; parallel terminals; and Green pneumatic push button (start).

The jacket 450 primarily serves as a shell and when combined with all the other pieces of the housing will form the entire enclosure for the "The Compressed Air Inverter Generator". A preferred embodiment of the jacket is made from 0.187" thick 500 series Aluminum alloy. Other materials and sizes are possible.

The PMA cover 452 is designed to act as an access port to gain access to the stator, rotor, hub assembly, primary inverter unit, voltage regulator, and other devices inside the enclosure. A preferred embodiment of the PMA cover has a rubber gasket to seal the enclosure from dirt and debris. The PMA cover connects to the bottom surface 432 of the base plate 430. In a preferred embodiment, the PMA cover bolts on to the bottom surface 432 of the base plate 430. A preferred embodiment of the PMA cover is made from 0.187" thick 500 series Aluminum alloy. Other materials and sizes are possible.

The stator 320, rotor 310, inverter unit 440, and voltage regulator (not shown) are enclosed in an enclosure formed by the assembly of the base plate 430, jacket 450, and a PMA (Permanent Magnet Alternator) Cover. The inverter unit 440 is mounted inside the chamber with heatsinks facing the top of the base plate. In one embodiment, the base plate has water jet cut vents located directly above the inverter unit's heatsink. The pressurized cooling air flows across the heat sink of the inverter unit and exits through the cooling air exhaust vent holes in the top of the base plate and out to atmosphere. The result is a positive pressure enclosed cooling chamber formed by the assembly of the base plate, jacket and the PMA Cover. The cooling air exhaust vent that is located in the top of the base plate may or may not have a fine mesh stainless steel screen or paper filter to eliminate debris from entering the enclosed chamber when the unit is off. This cooling method does not require a fan. One major advantage is that when the electrical load increases, the air motor inlet pressure will increase simultaneously, effectively increasing cooling air flow to the unit. The design is simple and effective, and the cost is minimal.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

What is claimed is:

1. A hub assembly for use in a compressed air driven inverter generator, the hub assembly comprising:
   a hub comprising a plate with a cylindrical protrusion centered on a bottom face and a bore hole through the center of the plate and the cylindrical protrusion, the cylindrical protrusion sized to fit into an inner bore hole of a stator and the bore hole of the hub sized to fit around without contacting an output shaft of an air motor of the generator, the plate also having a trench on a bottom face, the trench forming a closed loop, a plurality of cooling ports through the hub evenly spaced in the trench and a plurality of mounting holes though the plate, and a socket on a top face opposite the bottom face, the socket being concentric with the bore hole of the hub and sized to fit around the exterior of the air motor;
   a diffuser plate configured to attach to the bottom face of the hub with a plurality of air holes extending through the diffuser plate, the air holes having a same radius as a centre of the trench, the plate and the diffuser plate when assembled forming a 360 degree enclosed air channel;
   a hub spacer in contact with a side of the diffuser plate opposite the hub.

2. The hub assembly of claim 1, wherein the plate of the hub is circular, the trench is circular, the air holes are in a circular pattern, and the hub spacer is ring-shaped.

3. The hub assembly of claim 1, wherein the diffuser plate comprises 12 air holes.

4. The hub assembly of claim 1 wherein the hub comprises 3 cooling ports.

5. The hub assembly of claim 1 wherein the mounting holes are evenly spaced apart.

6. The hub assembly of claim 1 wherein the air holes are evenly spaced apart.

7. The hub assembly of claim 1 wherein the hub spacer sits on a shoulder of the cylindrical protrusion.

8. A compressed air driven inverter generator comprising the hub assembly of claim 1.

9. The compressed air driven inverter generator of claim 8 comprising a low pressure cut off switch.

10. The compressed air driven inverter generator of claim 9 further comprising a key switch to override the low pressure cut off switch.

11. The compressed air driven inverter generator of claim 8 further comprising a housing, the housing configured to surround the hub assembly, a stator, a rotor and a portion of an air motor creating an air chamber.

12. The compressed air driven generator of claim 11, wherein airflow is directed in the air chamber through the hub assembly and over the stator and rotor.

13. The compressed air driven generator of claim 12, wherein the air chamber comprises a vent for the airflow to exit and is sealed other than at the vent.

\* \* \* \* \*